United States Patent [19]

Oyama et al.

[11] Patent Number: 5,244,943
[45] Date of Patent: Sep. 14, 1993

[54] NITRILE GROUP-CONTAINING HIGHLY SATURATED POLYMER RUBBER LATEX AND PROCESS FOR PRODUCTION THEREOF

[75] Inventors: Motofumi Oyama, Yokosuka; Osamu Mori; Nagatoshi Sugi, both of Yokohama, all of Japan

[73] Assignee: Nippon Zeon Co., Ltd., Tokyo, Japan

[21] Appl. No.: 879,140

[22] Filed: May 6, 1992

Related U.S. Application Data

[60] Continuation of Ser. No. 545,584, Jun. 29, 1990, abandoned, which is a division of Ser. No. 249,249, Sep. 26, 1988, abandoned, which is a continuation of Ser. No. 20,100, Feb. 27, 1987, abandoned.

[30] Foreign Application Priority Data

Feb. 28, 1986 [JP] Japan ................................. 61-43718

[51] Int. Cl.$^5$ ................................. C08J 3/00
[52] U.S. Cl. ................................. 523/336; 524/566; 524/828; 525/338
[58] Field of Search ................. 523/336; 524/566, 828; 525/338

[56] References Cited

U.S. PATENT DOCUMENTS

| | | | |
|---|---|---|---|
| 2,384,545 | 9/1945 | Fryling | 524/822 |
| 3,240,660 | 5/1966 | Atwell | 428/395 |
| 3,814,713 | 6/1974 | Honda et al. | 524/510 |
| 3,855,168 | 12/1974 | Ozeki et al. | 524/510 |
| 3,898,208 | 8/1975 | Krause | 524/575 |
| 4,404,329 | 9/1983 | Maeda et al. | 525/329.2 |
| 4,452,950 | 6/1984 | Wideman | 525/339 |
| 4,464,515 | 8/1984 | Rempel et al. | 525/338 |
| 4,560,729 | 12/1985 | Watanabe | 525/233 |

FOREIGN PATENT DOCUMENTS

| | | |
|---|---|---|
| 0194678 | 3/1986 | European Pat. Off. |
| 229971 | 11/1985 | Japan ................ 523/336 |
| 2070023 | 3/1981 | United Kingdom. |
| 2135904 | 5/1983 | United Kingdom. |

Primary Examiner—Joseph L. Schofer
Assistant Examiner—Peter D. Mulcahy
Attorney, Agent, or Firm—Sherman and Shalloway

[57] ABSTRACT

A nitrile group-containing rubber latex comprising an aqueous dispersion of a nitrile group-containing highly saturated rubber having an iodine value of not more than 120. The said rubber latex can be produced by converting a solution of a nitrile group-containing highly saturated polymer rubber having an iodine value of not more than 120 in an inert solvent into an oil-in-water emulsion using water and an emulsifier, and removing the solvent from the resulting emulsion.

6 Claims, No Drawings

NITRILE GROUP-CONTAINING HIGHLY SATURATED POLYMER RUBBER LATEX AND PROCESS FOR PRODUCTION THEREOF

This application is a continuation of application Ser. No. 07/545,584, filed Jun. 29, 1990, which is a division of application Ser. No. 07/249,249, filed Sep. 26, 1988, which is a continuation of Ser. No. 07/020,100, filed Feb. 27, 1987, all abandoned.

This invention relates to a nitrile group-containing highly saturated polymer rubber latex having an improved film strength both in the uncured and cured An acrylonitrile-butadiene copolymer rubber (NBR) latex having excellent oil resistance, chemical resistance and adhesion to polar materials such as fibers or leathers has been widely used heretofore as a polymer rubber latex containing a nitrile group. The NBR latex, however, has lower film strength in the uncured and cured states than a natural rubber latex. In an attempt to overcome this defect, an NBR-type latex obtained by copolymerizing an ethylenically unsaturated carboxylic acid or isoprene as a third component was developed. The properties of this latex, however, are not sufficient, and are still desired to be improved.

It is an object of this invention therefore to provide a nitrile group-containing polymer rubber latex having improved film strength both in the uncured and cured states.

According to this invention, this object is achieved by a nitrile group-containing rubber latex comprising an aqueous dispersion of a nitrile group-containing highly saturated polymer rubber having an iodine value of not more than 120.

The nitrile group-containing highly saturated polymer rubber latex of this invention can be produced by adding a solution of a nitrile group-containing highly saturated polymer rubber having an iodine value of not more than 120 to water containing an emulsifier to form an oil-in-water emulsion, and removing the solvent from the emulsion.

Since the nitrile group-containing highly saturated polymer rubber used in this invention requires oil resistance, the content of its nitrile group-containing monomer units may be properly selected usually within the range of 5 to 60% by weight according to the use (solvents or oils to be contacted) of the final polymer.

To obtain satisfactory dry film strength both in the uncured and cured states, the nitrile group-containing saturated polymer rubber in the present invention should have an iodine value of not more than 120. If its iodine value exceeds 120, its dry film strength both in the uncured and cured states is reduced. The preferred iodine value is 0 to 100, especially 0 to 85.

Examples of the nitrile group-containing highly saturated polymer rubber are polymer rubbers obtained by hydrogenating the conjugated diene units of unsaturated nitrile/conjugated diene copolymer rubbers, and polymer rubbers obtained by hydrogenating the conjugated diene monomer units of unsaturated nitrile/conjugated diene/ethylenically unsaturated monomer terpolymer rubbers. These nitrile group-containing highly saturated polymer rubbers can be obtained by using ordinary polymerization techniques and ordinary hydrogenating methods. Needless to say, however, the method of producing these rubbers is not particularly restricted in the present invention.

Examples of the unsaturated nitrile are acrylonitrile and methacrylonitrile. Examples of the conjugated dienes are 1,3-butadiene, 2,3-dimethylbutadiene, isoprene and 1,3-pentadiene. Examples of the ethylenically unsaturated monomer include unsaturated carboxylic acids such as acrylic acid, methacrylic acid, itaconic acid and maleic acid, and salts thereof such as alkali metal or ammonium salts thereof; esters of the above carboxylic acids such as methyl acrylate, ethyl acrylate, butyl acrylate and 2-ethylhexyl acrylate; alkoxyalkyl esters of the above unsaturated carboxylic acids such as methoxymethyl acrylate, ethoxyethyl acrylate and methoxyethoxyethyl acrylate; acrylamide and methacrylamide; N-substituted (meth)acrylamides such as N-methylol (meth)acrylamide, N,N'-dimethylol (meth)acrylamide and N-ethoxymethyl (meth)acrylamide; and cyanoalkyl esters of (meth)acrylic acid such as cyanomethyl (meth)acrylate, 2-cyanoethyl (meth)acrylate, 3-cyanopropyl (meth)acrylate and 4-cyanobutyl (meth)acrylate.

Specific examples of the nitrile group-containing highly saturated polymer rubbers used in this invention are a hydrogenation product of butadiene/acrylonitrile copolymer rubber, a hydrogenation product of isoprene/butadiene/acrylonitrile copolymer rubber, a hydrogenation product of isoprene/acrylonitrile copolymer rubber, a hydrogenation product of butadiene/methyl acrylate/acrylonitrile copolymer rubber, and a hydrogenation product of butadiene/acrylic acid/acrylonitrile copolymer rubber.

The iodine value of the polymers used in this invention is determined in accordance with JIS K0070.

The nitrile group-containing highly saturated polymer rubber latex of this invention is a dispersion of the above rubber in water. The latex can be prepared easily by an ordinary method which comprises adding a solution of the rubber to water containing an emulsifier with stirring to emulsify it and form an oil-in-water emulsion, and removing the solvent from the emulsion.

The solution of the nitrile group-containing highly saturated polymer rubber may be the polymer solution as obtained at the end of polymerization and hydrogenation either as such or after dilution, or a solution of the rubber as a solid in a solvent.

Solvents capable of dissolving the above rubbers may be used as the solvent either singly or in combination. Examples include halogenated hydrocarbon solvents such as dichloroethane and chloroform, and ketones such as methyl ethyl ketone, acetone or tetrahydrofuran. It is also possible to use a mixture of such a solvent with a solvent incapable of dissolving these rubbers, for example an aliphatic or alicyclic hydrocarbon such as butane, pentane, n-hexane and cyclohexane or an aromatic solvent such as benzene, toluene and xylene. The concentration of the rubber in the solution is usually 1 to 30% by weight, preferably 5 to 15% by weight.

Examples of emulsifiers that can be used include anionic emulsifiers such as higher fatty acid salts, rosin acid salts, dialkylsulfosuccinic acid salts, alkyl- or arylsulfonic acid salts, alkyl- or aryl-sulfuric acid salts and aliphatic alcohol phosphoric ester salts. Specific examples of the higher fatty acid salts are sodium and potassium salts of fatty acids having 8 to 18 carbon atoms such as oleic acid, stearic acid, palmitic acid and lauric acid. Specific examples of the rosin acid salts are sodium and potassium salts of natural rosin acids, and disproportionated or hydrogenated rosin acids prepared therefrom. Specific examples of the dialkylsulfosuccinic acids are sodium and potassium salts of dialkylsuccinic acids having 4 to 12 carbon atoms in the alkyl moiety such as dibutylsulfosuccinic acid and dioctylsulfosuccinic acid. Specific examples of the alkylsulfonic acid salts are sodium and potassium salts of sulfonic acids having linear alkyl groups, which are biodegradable. Specific examples of the arylsulfonic acid salts are sodium and potassium salts of ($C_{8-18}$-alkyl)benzenesulfonic acids such as dodecylbenzenesulfonic acid and octylbenzenesulfonic acid. Specific examples of the sulfuric acid esters are sodium octylsulfate and sodium lauryl sulfate. Specific examples of the phosphoric ester salts are a sodium salt of octyl alcohol phosphoric ester and a sodium salt of lauryl alcohol phosphoric ester.

These anionic emulsifiers may be used in combination with nonionic emulsifiers such as polyoxyethylene alkyl phenol ethers and polyoxyethylene alkyl esters.

To obtain a stable latex, the amount of the emulsifier is desirably 1 to 20 parts by weight, preferably 2 to 10 parts by weight, per 100 parts by weight of the rubber.

Emulsification is generally carried out by mixing the rubber solution with water containing the emulsifier. Since the resulting emulsion and latex are stable in alkalinity with a pH of 8 to 13, a pH adjusting agent such as sodium hydroxide or potassium hydroxide may be added to water in advance.

The volume ratio of the rubber solution to water at the time of emulsification is suitably from 3:1 to 1:20. Emulsification is carried out by using ordinary mixing means such as a homomixer, a colloid mill, a homogenizer, a Disper mill, a line mixer or an ultrasonic emulsification device. The size of the dispersed rubber particles in the resulting latex (the particle diameter of the latex) is determined depending upon the emulsification conditions such as the amount of the emulsifier, the amount of water, and the intensity of stirring. An optimum latex particle diameter may be selected according to the purpose for which the latex is used. Usually, it is 0.05 to 5 microns.

The solvent is removed from the emulsion by a known method such as steam distillation and distillation under reduced pressure. As required, the latex resulting from solvent removal may be concentrated by centrifugation, creaming, evaporation under heat, etc.

The latex of this invention is adjusted to a total solids content of 1 to 70% by weight, and used in various applications.

The nitrile group-containing highly saturated polymer in the latex of this invention contains little or no gelled portion (a portion insoluble in the solvent). In spite of this, an uncured film obtained by casting the latex of this invention has much improved strength over an uncured film of a conventional NBR latex containing a considerable amount of a gelled portion. A cured film from the latex of this invention also has very high strength and excellent oil resistance and thermal resistance. Accordingly, the latex of this invention is useful as a textile treating agent such as a binder for nonwoven fabrics, a paper treating agent as in the production of impregnated paper, a raw material for articles to be used in oil, a raw material for foam rubbers, a raw material for a thread-shaped rubber and as a binder for cork.

The following Examples illustrate the present invention specifically. It should be understood however that the invention is not limited to these examples.

EXAMPLE 1

Preparation of nitrile group-containing highly saturated polymer rubbers

The acrylonitrile/butadiene copolymer rubbers (NBR) and butadiene/butyl acrylate/acrylonitrile terpolymers obtained by emulsion polymerization, as indicated in Table 1, were each dissolved in methyl isobutyl ketone, and hydrogenated using a Pd-carbon catalyst to obtain hydrogenated NBRs and hydrogenated acrylonitrile/butadiene/butyl acrylate terpolymer rubbers having the iodine values indicated in Table 1.

TABLE 1

| | | Rubber designation | | | | | | | |
|---|---|---|---|---|---|---|---|---|---|
| | | Acrylonitrile-butadiene copolymer rubber | | | | | Acrylonitrile butadiene-butyl acrylate co-polymer rubber | | |
| Monomer composition | | A | B | C | D | E | F | G | H |
| Before hydrogenation | Bonded acrylonitrile (% by weight) | 37 | 37 | 45 | 37 | 33 | 35 | 35 | 35 |
| | Butyl acrylate units (wt. %) | — | — | — | — | — | 25 | 35 | 35 |
| | Butaidene units (wt. %) | 63 | 63 | 55 | 63 | 67 | 40 | 30 | 30 |
| | Iodine value | 290 | 290 | 255 | 290 | 308 | 185 | 138 | 138 |
| After hydrogenation | Iodine value (% by weight) | 103 | 51 | 25 | 159 | — | 20 | — | 23 |

Preparation of latices

Each of the hydrogenated rubber samples shown in Table 1 was dissolved in a toluene/dichloroethane (75/25 by volume %) mixed solvent. The resulting rubber solution was poured into an aqueous emulsifier solution composed of 1.2 g of potassium oleate, 1.2 g of a potassium salt of rosin acid, 0.045 g of potassium hydroxide and 300 g of water with stirring. The mixture was stirred at room temperature by a TK-homomixer (model M, made by Tokushu Kika Kogyo Co., Ltd.) at 10,000 rpm for 10 minutes. The resulting emulsion was subjected to steam stripping to remove the solvent, and then concentrated by an evaporator to form a latex having a solids content of about 30%. The latex was centrifuged at room temperature and 3,000 rpm for 15 minutes to remove the excess of the emulsifier and concentrate it.

The solids contents and pH values of latices obtained as above are shown in Table 3. A toluene-insoluble portion (after immersion in toluene at room temperature for 48 hours) was not found to exist in these latices.

Uncured films and cured films were prepared from these latices, and subjected to a tensile test in accordance with JIS K6301. The results are also shown in Table 3.

Preparation of uncured films

Each of the latices was cast on a glass plate, and dried at a temperature of 20° C. and a humidity of 65% for 3 days. A JIS #3 dumbbell specimen was prepared from the resulting film.

Preparation of cured films

Each of the latices was compounded in accordance with recipe I or II shown in Table 2 below. The compounded stock was cast onto a glass plate, dried at a temperature of 20° C. and a humidity of 65% for 3 days, and then cured at 100° C. for 30 minutes. A JIS #3 dumbbell specimen was prepared from the resulting cured film.

TABLE 2

| Compounding recipe (ther figures show parts by weight) | I | II |
|---|---|---|
| Latex (see Table 3) | 100 (solids) | 100 (solids) |
| Colloidal sulfur | 1 | — |
| Zinc oxide | 2 | — |
| Zinc diethyldithiocarbamate | 1 | — |
| Zinc salt of 2-mercaptobenzothiazole | 1 | — |
| t-Butyl hydroperoxide | — | 0.5 |
| Tetraethylenepentamine | — | 0.5 |

TABLE 3

| | | Invention | | | | | Comparison | | |
|---|---|---|---|---|---|---|---|---|---|
| Latex | Rubber No. | A* | B* | C* | F* | H* | D* | E | G |
| | Solids content (wt. %) | 45.3 | 45.5 | 45.0 | 45.0 | 45.6 | 45.0 | 45.4 | 45.4 |
| | pH | 9.3 | 9.5 | 9.2 | 9.2 | 9.3 | 9.0 | 9.3 | 9.3 |
| | Average particle diameter(**) | 0.61 | 0.54 | 0.32 | 0.58 | 0.49 | 0.43 | 0.72 | 0.51 |
| Recipe | | I | I | II | II | I | I | II | I |
| Uncured film | | | | | | | | | |
| 500% Tensile stress (kg/cm$^2$) | | 6 | 7 | 8 | 6 | 7 | 6 | 5 | 7 |
| Tensile strength (kg/cm$^2$) | | 18 | 20 | 48 | 30 | 22 | 14 | 13 | 9 |
| Cured film | | | | | | | | | |
| 300% Tensile stress (kg/cm$^2$) | | 17 | 19 | 29 | 25 | 19 | 13 | 12 | 13 |
| Tensile strength (kg/cm$^2$) | | 120 | 215 | 288 | 165 | 156 | 56 | 58 | 52 |

*Hydrogenated rubbers
(**)Determined from electron microscopic observation

The results given in Table 3 demonstrate that the uncured films and cured films obtained by using the latices of this invention have much improved tensile strength over the uncured films and cured films obtained by using latices outside the scope of the invention.

A commercially available NBR latex (a copolymer of acrylonitrile and butadiene produced by emulsion polymerization having a medium high bonded acrylonitrile content, a toluene-insoluble content of 53% by weight, an average particle diameter of 0.05 micron and a solids content of 41% by weight which was produced by Nippon Zeon Co., Ltd. and is available under the tradename NIPOL Lx-1562) was subjected to the same test as above. As a result, the uncured film had a tensile strength of 6.3 kg/cm$^2$, and the cured film (recipe I) had a tensile strength of 103 kg/cm$^2$.

EXAMPLE 2

Hydrogenated NBRs having an iodine value of 78 and 30 were prepared by hydrogenating an acrylonitrile/butadiene copolymer rubber (NBR) having a bonded acrylonitrile content of 37% by weight in the same way as in Example 1. One hundred grams of one of these hydrogenated NBRs was dissolved in a mixed solvent composed of 450 g of cyclohexane and 450 g of methyl ethyl ketone. The solution was poured into an aqueous emulsifier solution composed of 5 g of sodium linear alkylbenzenesulfonate (LAS), 0.5 g of potassium hydroxide and 1,000 g of water, and the mixture was stirred strongly by a TK homomixer at room temperature and 10,000 rpm for 10 minutes. The emulsion was then worked up as in Example 1 to concentrate it and remove the excess of the emulsifier and thus form a latex. A latex was also prepared in the same way from the other hydrogenated NBR.

The properties of these latices and uncured and cured films (recipe I) obtained from them are shown in Table 4.

TABLE 4

| | | Invention | |
|---|---|---|---|
| Latex | Rubber designation (iodine value) | I*(78) | J*(30) |
| | Solids content (wt. %) | 45.2 | 45.1 |
| | pH | 9.8 | 9.6 |
| | Average particle diameter ($\mu$) | 0.54 | 0.63 |
| Uncured film | | | |
| 500% Tensile stress (kg/cm$^2$) | | 7 | 8 |
| Tensile strength (kg/cm$^2$) | | 20 | 36 |
| Cured film | | | |
| 300% Tensile stress (kg/cm$^2$) | | 18 | 22 |
| Tensile strength (kg/cm$^2$) | | 173 | 235 |

*Hydrogenated rubbers

What is claimed is:

1. A process for producing a nitrile group-containing highly saturated polymer rubber latex having an average particle diameter of from about 0.32 to about 0.63$\mu$, which comprises converting an inert solvent solution of a nitrile group-containing highly saturated polymer rubber having an iodine value of not more than 120 obtained by hydrogenating a nitrile group-containing rubber having an iodine value of more than 120 in the form of a solution into an oil-in-water emulsion using water and an emulsifier, and removing the solvent from the resulting emulsion, said inert solvent being a mixture of a solvent capable of dissolving said rubber and a solvent incapable of dissolving said rubber.

2. The process of claim 1 wherein the nitrile group-containing highly saturated polymer rubber is obtained by hydrogenating the conjugated diene units of an unsaturated nitrile/conjugated diene copolymer rubber, or the conjugated diene units of an unsaturated nitrile/conjugated diene/ethylenically unsaturated monomer terpolymer rubber.

3. The process of claim 1 or 2 wherein the rubber has an unsaturated nitrile content of 5 to 60% by weight.

4. The process of any one of claims 1 to 2 wherein the emulsifier is an anionic emulsifier.

5. The process of claim 3 wherein the emulsifier is an anionic emulsifier.

6. The process of claim 1, wherein said inert solvent is a mixture of an aromatic solvent and a halogenated hydrocarbon or a mixture of a ketone and an aliphatic or alicyclic hydrocarbon.

* * * * *